Aug. 22, 1933.  L. A. CHERRY ET AL  1,923,914
MACHINE FOR AFFIXING OPENING THREADS TO ENVELOPES
Filed July 27, 1931  10 Sheets-Sheet 1

INVENTOR
Lester A. Cherry
Augustus H. Lane
Clarence N. Fuller
BY Popp - Powers ATTORNEYS Aug. 22, 1933.  L. A. CHERRY ET AL  1,923,914
MACHINE FOR AFFIXING OPENING THREADS TO ENVELOPES
Filed July 27, 1931  10 Sheets-Sheet 2

INVENTOR
Lester A. Cherry
Augustus H. Lane
Clarence N. Futter
BY Popp + Powers ATTORNEYS

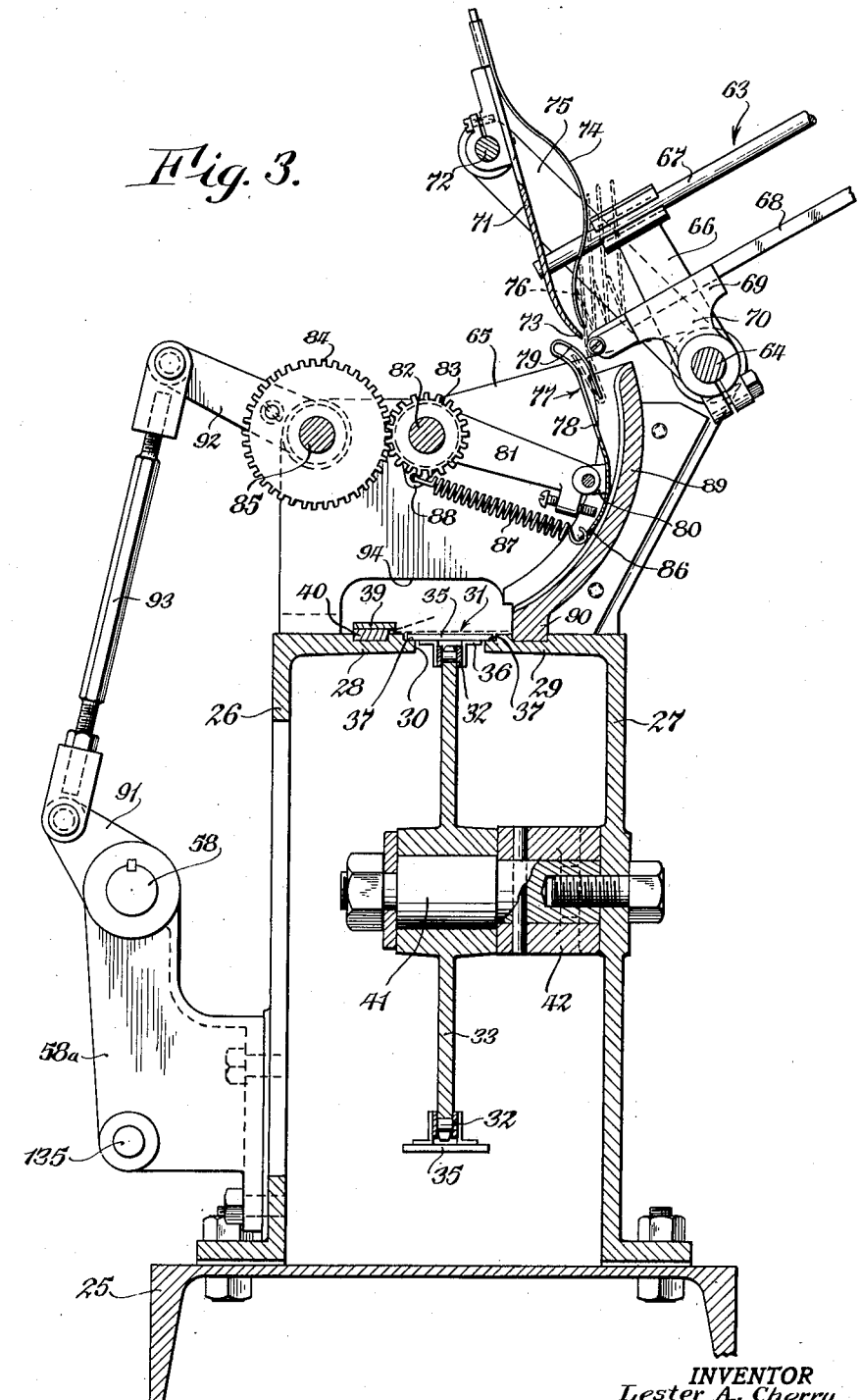

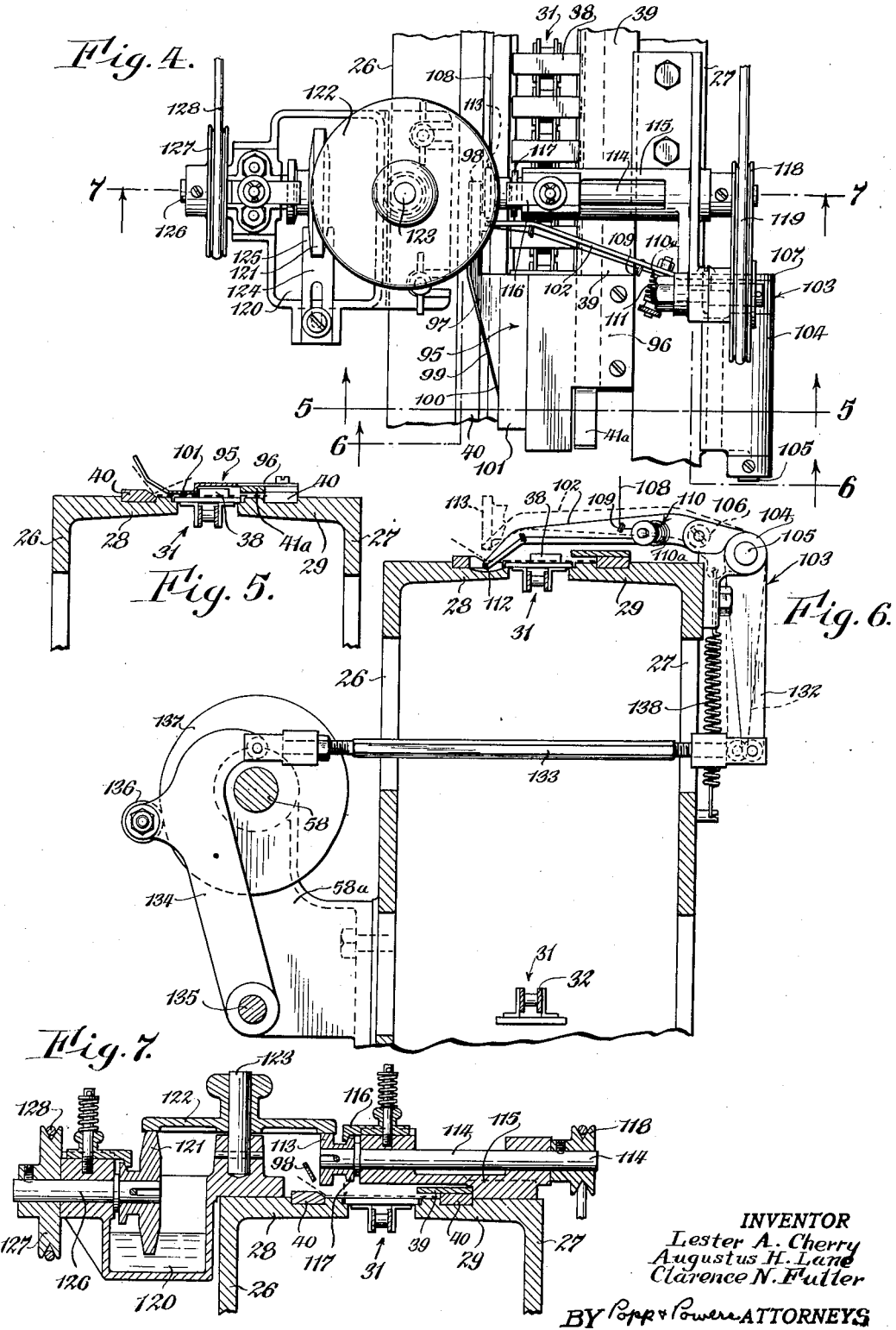

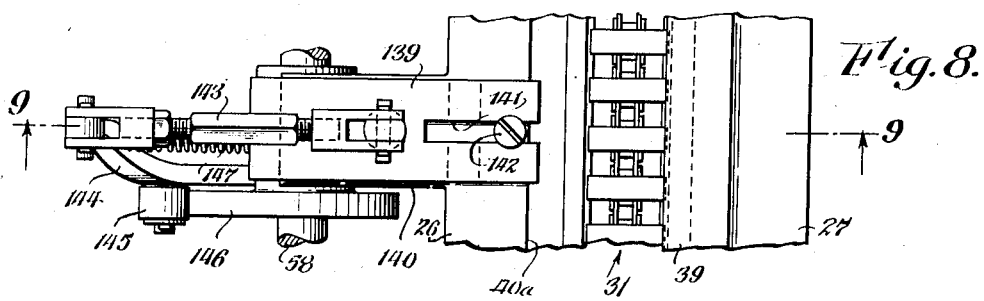
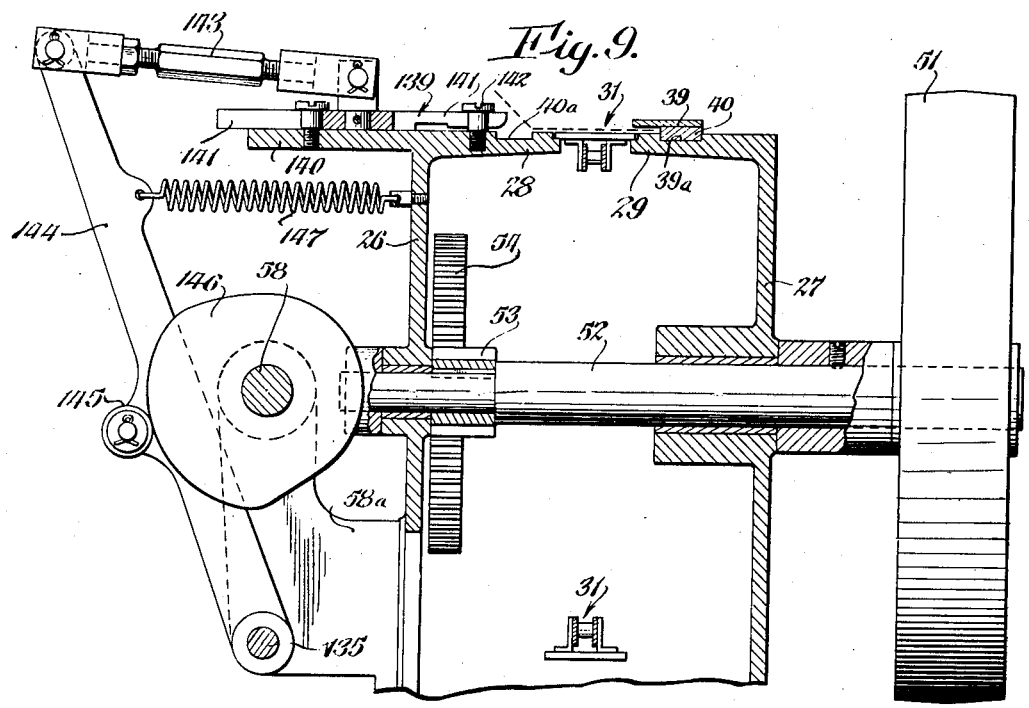

Aug. 22, 1933.  L. A. CHERRY ET AL  1,923,914
MACHINE FOR AFFIXING OPENING THREADS TO ENVELOPES
Filed July 27, 1931  10 Sheets-Sheet 6

INVENTOR
Lester A. Cherry
Augustus H. Lane
Clarence N. Fuller
BY Popp & Powers ATTORNEYS

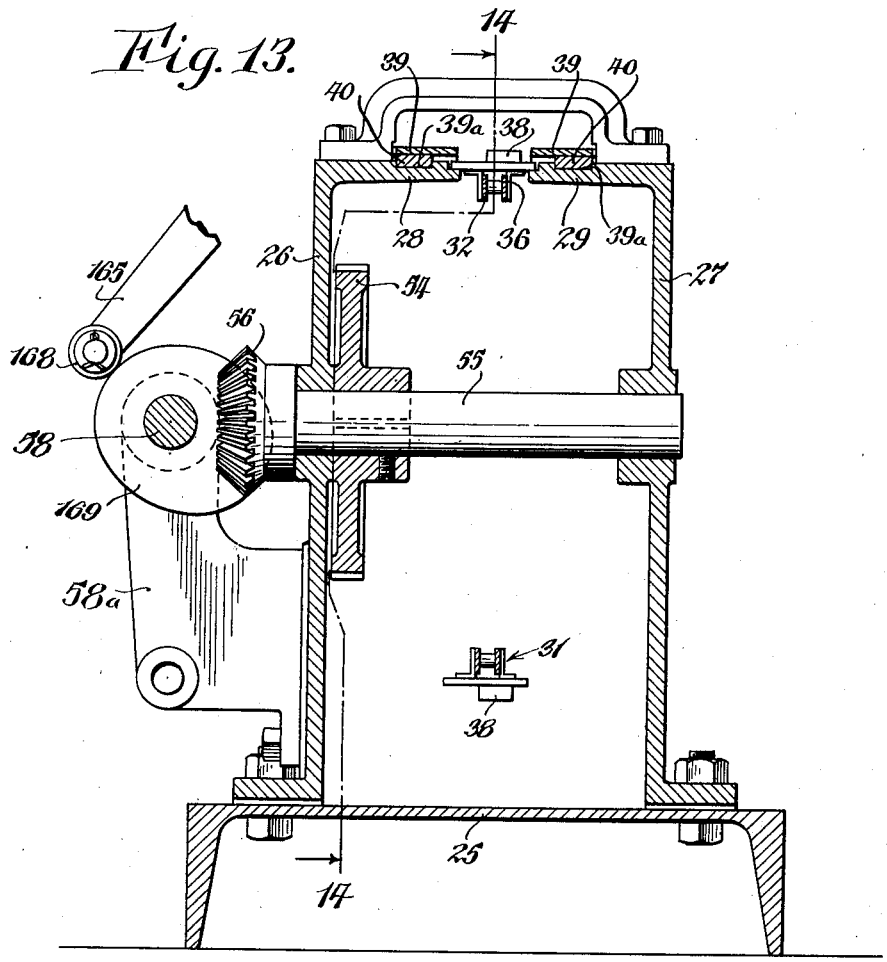

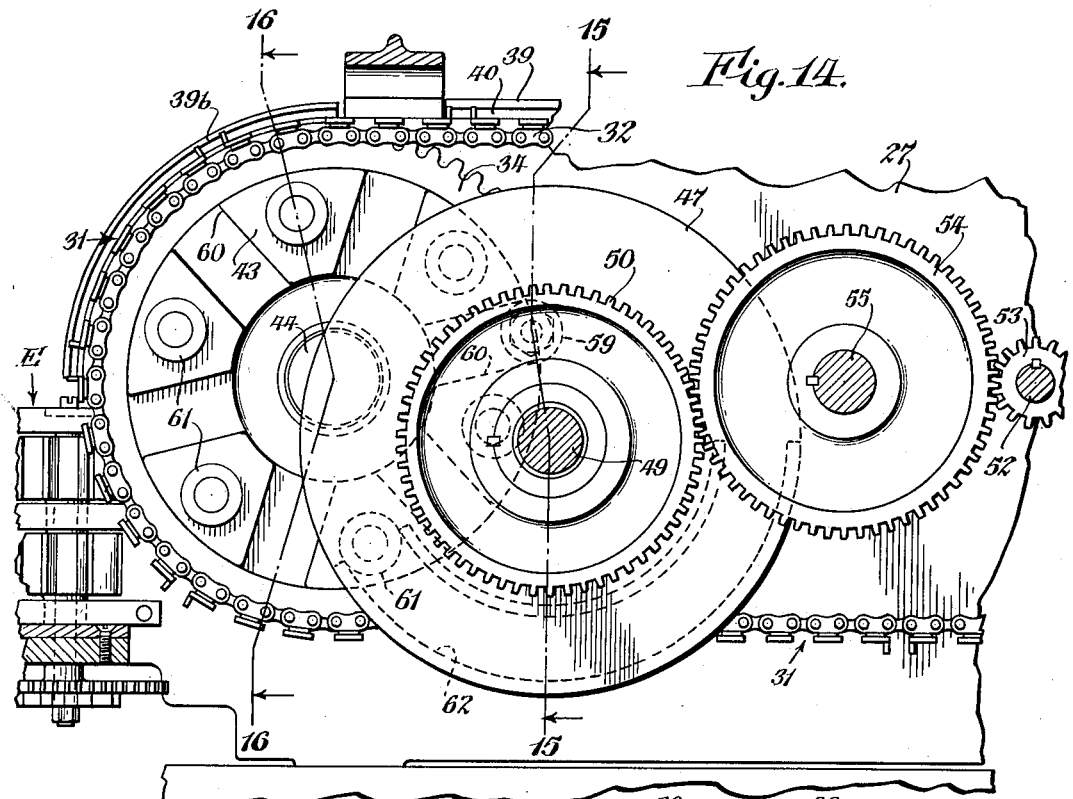
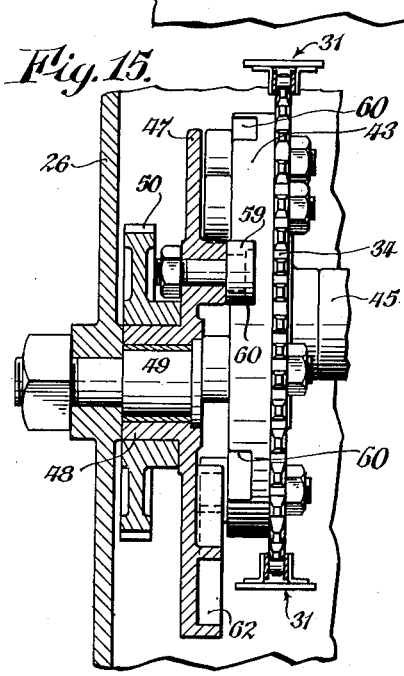
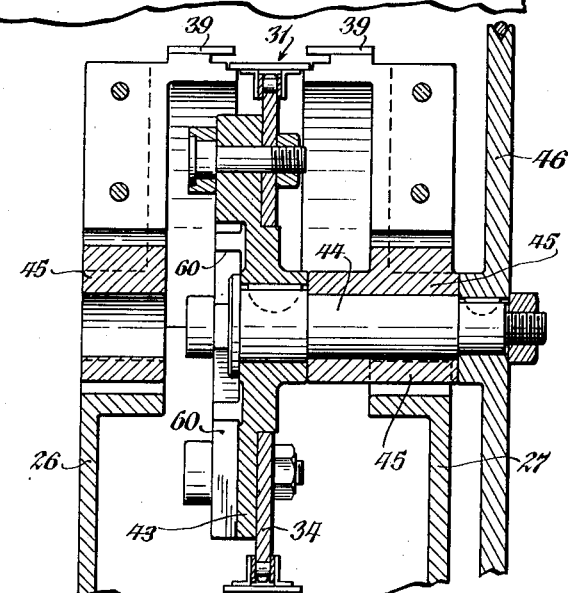

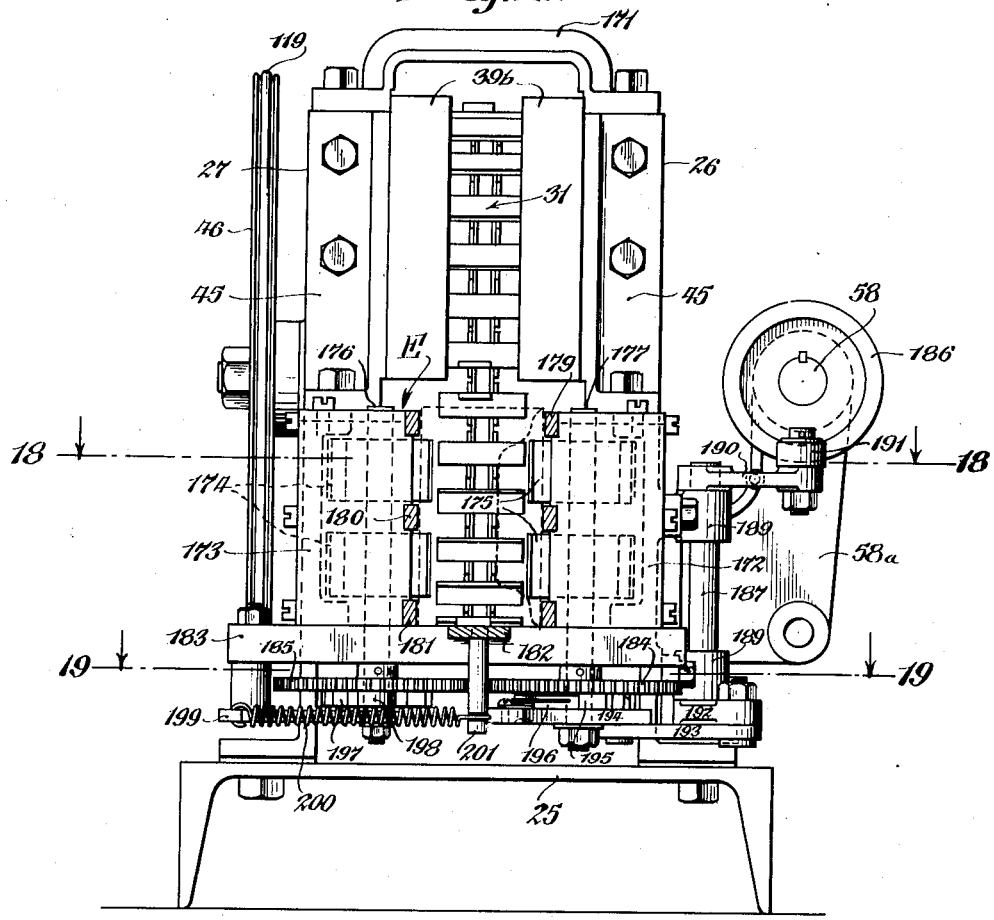
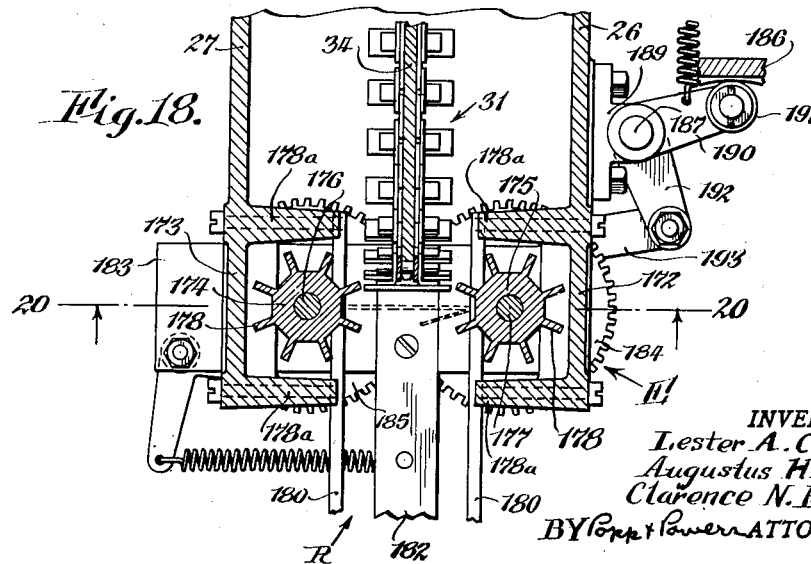

INVENTOR
Lester A. Cherry
Augustus H. Lane
Clarence N. Fuller
BY Pope & Powers ATTORNEYS Patented Aug. 22, 1933

1,923,914

UNITED STATES PATENT OFFICE 1,923,914

MACHINE FOR AFFIXING OPENING THREADS TO ENVELOPES

Lester A. Cherry, Kenmore, Clarence N. Fuller, Tonawanda, and Augustus H. Lane, Buffalo, N. Y., assignors to H. W. Hilliard Co. Inc., Buffalo, N. Y., a Corporation of New York Application July 27, 1931. Serial No. 553,348

42 Claims. (Cl. 93—76)

This invention relates to improvements in machines for affixing opening threads to envelopes in order that they may be conveniently opened after having been sealed. More particularly the invention is concerned with a machine for applying such threads to the envelopes after they have been made and the invention, therefore, proposes a machine which is adapted to affix an opening thread adjacent the juncture of the sealing flap and the body of the envelope, the thread being of such a length that an end thereof extends beyond the envelope body to provide a protruding end, whereby after the envelope has been sealed, it may be opened along the fold provided by the sealing flap and the body of the envelope by pulling one of the ends in a direction transverse of the said fold.

One object of the invention is the novel arrangement and construction of the various mechanisms utilized in the performance of the several operations whereby simplicity of construction and operation is obtained.

A further object is to effect the securement of the opening threads to the envelopes in such a manner that a positive tearing action is insured without possibility of lengthwise slippage of the threads.

A still further object is to provide for the application of the adhesive to only that portion of the thread which is to be affixed to the envelope, those portions which provide the protruding ends escaping the action of the adhesive applying means whereby possibility of the envelopes or their threads adhering to each other or to adjacent parts of the machine into which they come into contact is avoided.

Other objects will be apparent as the description of the invention proceeds.

The invention is illustrated in the accompanying drawings, in which:

Figure 3 is a transverse section of the machine taken along line 3—3 of Figure 2.

Figure 4 is an enlarged fragmentary view of that portion of the machine which includes the mechanism for controlling the feeding movement of the thread and for applying the adhesive to the latter.

Figure 5 is a transverse section taken along line 5—5 of Figure 4 just in front of the adhesive applying mechanism showing the horn by which the flap of the envelope is opened prior to the positioning of the opening thread adjacent the juncture of the sealing flap and the body of the envelope.

Figure 6 is a similar section along line 6—6 of Figure 4 showing the means by which the application of the adhesive to the opening thread is controlled.

Figure 7 is a section through the adhesive applying mechanism taken along line 7—7 of Figure 4.

Figure 8 is a fragmentary view in plan of the machine showing the mechanism by which the sealing flap is folded upon the thread after the latter has been placed in its intended position along or adjacent the juncture of the flap and the body of the envelope.

Figure 9 is a transverse section of the same mechanism taken along line 9—9 of Figure 8.

Figure 13 is a transverse section through the machine taken along line 13—13 of Figure 1.

Figure 14 is an enlarged detail view of the driving means for the various operating mechanisms and is taken along line 14—14 of Figure 13.

Figure 15 is a transverse section of the same taken along line 15—15 of Figure 14.

Figure 16 is a similar section taken along line 16—16 of Figure 14.

Figure 17 is a view in elevation of the delivery end of the machine.

Figure 18 is a horizontal fragmentary section taken along line 18—18 of Figure 17 and showing the envelope ejecting mechanism at this end of the machine.

The envelopes to which opening threads are to be affixed are initially placed in a magazine provided for this purpose. They are withdrawn from the said magazine one at a time by suitable mechanism and are delivered to a conveyor by which they are moved through the machine in single file. In its passage through the machine each envelope is carried into co-operating relation with the various mechanisms each of which takes a part in the securement of the opening thread, the operations performed by the said mechanism being, in the order of their performance, as follows:

(1) The sealing flap of the envelope is opened and held in this position. (2) The opening thread to which the adhesive has been applied is positioned along, or adjacent, the juncture of the sealing flap and the body of the envelope. (3) The sealing flap is then closed, that is to say folded upon the thread to the position in which it is folded when sealed. (4) The thread is squeezed between the sealing flap and the body of the envelope. (5) The thread is then cut off beyond an end of the envelope to provide a protruding end which may be grasped when the envelope is being opened after it has been sealed. (6) The envelope with the opening thread affixed is delivered to a receiving rack from which it may be removed at the convenience of the operator.

Figure 1:
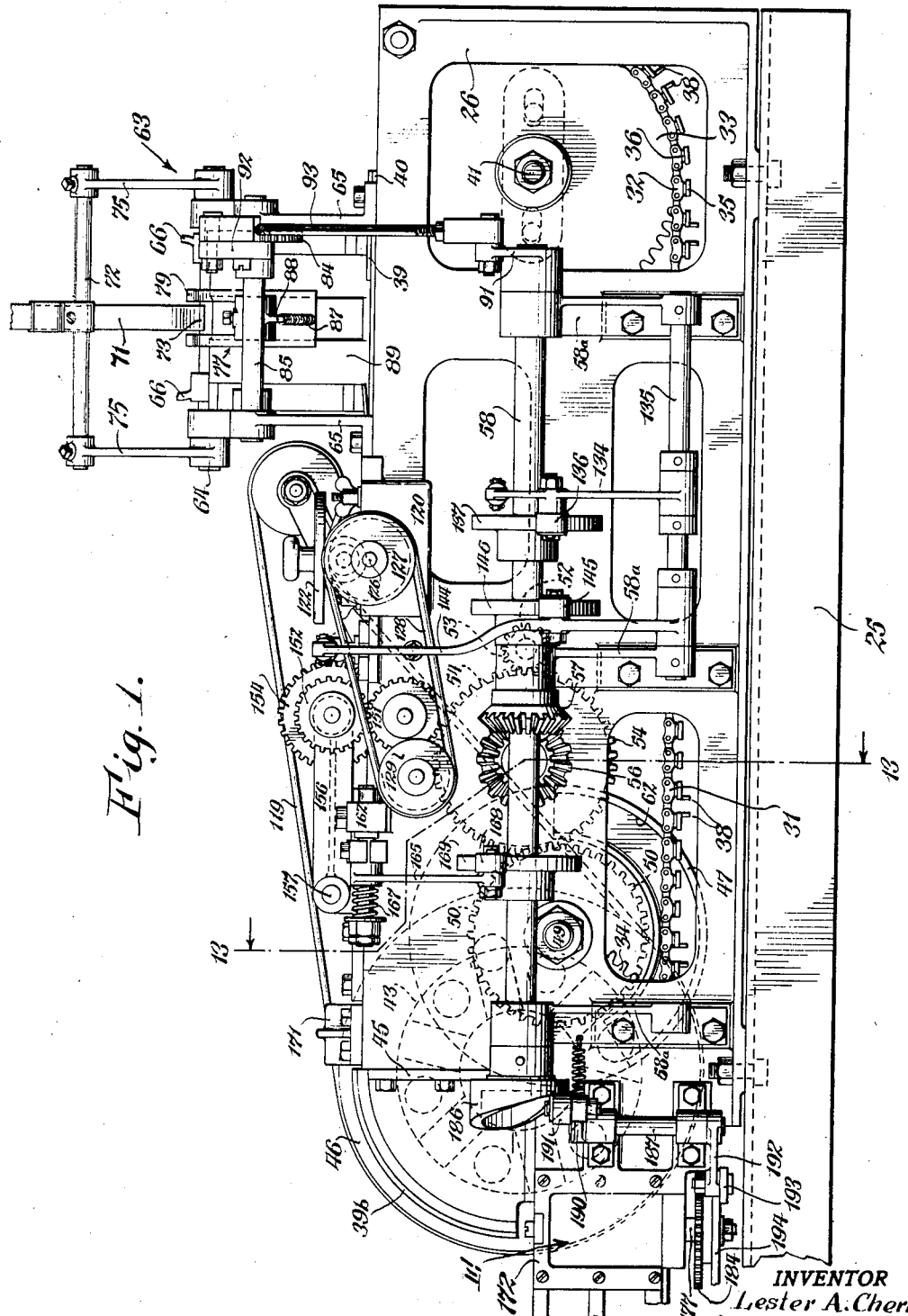
Figure 1 is a side elevation of a machine embodying the various features of the invention.
Figure 2:
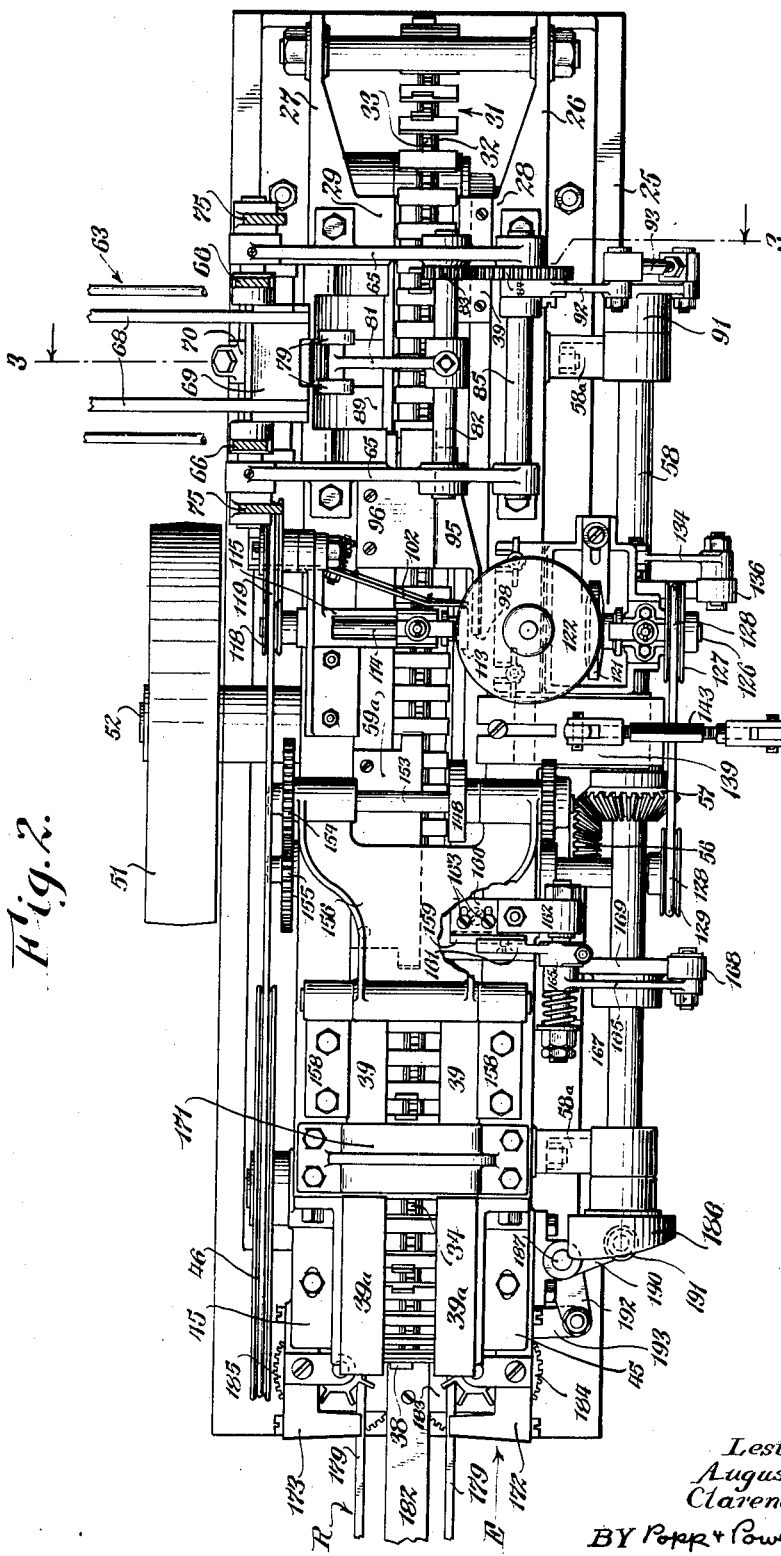
Figure 2 is a top plan view of the same.

As best shown in Figures 1, 2 and 3, the mechanisms for carrying out the various operations above enumerated and for carrying out the various operations incidental thereto are all included in a single machine. The framework of the said machine consists of a suitable supporting base 25 upon which are carried the side frame members 26 and 27, the latter being formed with suitable flanges along their bottoms by which their securement to the base 25 is effected and being formed at their tops with inwardly extending flanges 28 and 29 which terminate short of each other to provide a longitudinally extending opening 30 in which the upper flight of a conveyor 31 moves.

The conveyor 31, as stated, is adapted to carry the envelopes fed to it in a single file into co-operating relation with the various operating mechanisms of the machine. As shown, it includes an endless chain 32 carried by sprockets 33 and 34 mounted at the feed and delivery ends respectively of the machine.

The chain 32 carries a series of cross bars 35 (Fig. 3) which are suitably secured thereto by angle members 36, the said bars being spaced at short intervals throughout the extent of the chain. The upper flight, therefore, of the conveyor consists of a moving supporting surface of the width of the cross bars 35. In this connection it will be noted that the inwardly extending portions 28 and 29 of the side frame members are cut away along their adjacent uppermost edges to provide ledges 37 along which the ends of the bars 35 move, the upper surfaces of the bars being substantially flush with the adjacent surfaces of the inwardly extending portions 28 and 29 of the side frame members.

Certain of the bars 35 are formed or provided with upwardly extending shoulders 38 (Figures 1 and 2). The shoulders occur in pairs about the conveyor, the distance between the shoulders of each pair being such as to permit the positioning of an envelope between them.

Along either side of the opening 30 are guide rails 39 (Figures 3 and 13). The said rails are supported in spaced relation to the upper surfaces of the inwardly extending portions 28 and 29 of the side frame members by suitable spacing members 40 which are positioned in longitudinally extending slots 39a formed in the said inwardly extending portions. The inner sides of the spacing members 40 define the width of the path in which the envelopes are moved by the conveyor while the guide rails 39 extend inwardly over the said members and hence overlie the said path. It will be apparent, therefore, that in travelling through the machine an envelope is engaged at its rearmost end by a shoulder 38 and moved in the direction of its length along the path defined by the spacing members 40 and the guide rails 39.

At the feed end of the machine the sprocket 33 is mounted upon a stub shaft 41, which is suitably supported from the side frame member 27 of the machine by a block 42 (Figures 1 and 3). The latter is adjustable lengthwise of the machine whereby the desired degree of tension upon the chain 32 may be obtained.

In order to insure accurate co-operation between the various operating mechanisms and the envelopes as they rest upon the conveyor 31, it is preferred that the movement of the latter be step-by-step so that certain of the operations may be effected during the rest periods of the conveyor. The sprocket 34 at the delivery end of the machine is, therefore, suitably secured to the driven member 43 of a Geneva gearing. The member 43 is keyed upon a shaft 44 which is journalled in one of a pair of sector-like blocks 45 secured at the delivery end of the machine to the side frame members 26 and 27. A pulley 46 is carried upon the outer end of the shaft 44. The driving member 47 is of the Geneva gearing (see Figures 1, 14, 15 and 16) is formed or provided with a hub 48 (Figure 15) and is carried by a stub shaft 49 mounted upon the side frame member 26. A gear 50 is secured upon the hub 48 of the driving member 47 and is included in the gear train by which the machine is connected to power.

The machine is connected to a suitable source of power by a pulley 51 which is mounted upon a main drive shaft 52 (Figure 9), the said drive shaft being suitably journalled in the opposite side frame members 26 and 27. At its inner end, the drive shaft 52 carried a gear 53 (see also Figures 1 and 14) and the latter in turn meshes with a reducing gear 54. The gear 54 is mounted upon a transverse shaft 55 (Figure 13) which also is journalled in the side frame member 26 and 27. The shaft 55 extends through the side frame member 26 and carries a bevelled gear 56 upon its outer end.

The reducing gear 54 meshes with the gear 50 of the Geneva gearing while the bevelled gear 56 meshes with a companion bevelled gear 57 (Figure 1) carried by a longitudinally extending cam shaft 58. Thus, when the drive pulley 51 is connected to power a continuous rotary movement is imparted to the driving member 47 of the Geneva gearing and to the main cam shaft 58. The said cam shaft is supported lengthwise of the machine from the side frame member 26 by bearing brackets 58a.

The Geneva gearing is best shown in Figures 14, 15 and 16. The driving member 47 thereof carries a roller 59 which cooperates in the usual manner with radial slots 60 formed or provided in the driven member 43. The continuous rotary movement, therefore, of the driving member 47 effects an intermittent movement of the driven member 43, and hence an intermittent forward movement of the conveyor 31.

It is preferred that during the rest intervals of the conveyor that the driven member 43, and hence the conveyor, be locked against movement.

The driven member 43, therefore, is provided with a circular series of locking rollers 61, one of which is arranged between each adjacent pair of radial slots 60. The rollers 61 operate in an arcuate channel 62 formed in the driving member 47. The channel 62 is concentric with the shaft 49. It is so designed that as the roller 59 approaches the end of the radial slot 60 in which it is working, the leading end of the channel 62 is approaching one of the locking rollers 61 and the walls of the said channel engage the said locking roller until the roller 59 enters the next succeeding radial slot 60 at which time the trailing end of the channel 62 passes beyond the locking roller. It will, of course, be apparent that inasmuch as the channel 62 is concentric with the shaft 49 the walls of the channel will permit passage of the locking rollers between them while preventing movement of the driven member 43, and hence the conveyor 31, during the time that the roller 59 is moving from the exit of each radial slot to the entrance of the next succeeding slot.

The envelopes to which the opening threads are to be affixed are delivered to the machine at one end of the conveyor 31 from a magazine or rack 63 (Figures 1, 2 and 3). The said magazine or rack is carried upon a longitudinally extending shaft 64 which is mounted between a pair of vertical plates 65 arranged transversely of the machine. The said plates are suitably secured to the inwardly extending flanges 28 and 29 of the side frame members and extend over the conveyor 31, and hence the path to be traversed by the envelopes.

The magazine or rack 63 includes a pair of upwardly extending arms 66 (Figure 3) which are secured to the shaft 64 and which are formed to support the inner ends of the side rails 67 of the magazine, it being understood, of course, that these rails are preferably spaced apart a distance slightly greater than the length of the envelopes. The bottom of the magazine is provided by a pair of spaced rods 68 which lie below and between the side rails 67 and the said rods are carried by a bottom plate 69 which is formed with a depending extension 70, by which it is secured upon the shaft 64. The rails 68 fit in suitable slots formed in the bottom plate 69 so that their upper surfaces are flush with the upper surface of the said plate thereby insuring the desired feeding movement of the envelopes in the magazine without intereference from obstructions in the path of their movement.

The envelopes are placed in the magazine 63 with their sealing flap downward and facing the direction of feed. At the front end of the magazine 63 an arm 71 is supported from a longitudinally extending shaft 72 so that its lower end 73 provides with the forward edge of the plate 69 an opening through which the envelopes may be withdrawn from the magazine. The arm 71 carries upon its rear side a spring member 74, the lower end of which terminates a slight distance above, but close to the lower end 73 of the said arm. The spring member 74 serves as a support against which the envelopes in the magazine rest and prevents their accidental escape through the opening provided by the lower end of the arm 71 and the plate 69. The shaft 72 by which the arm 71 and spring member 74 are carried is supported from a pair of spacing arms 75 which are carried by the shaft 64. It will be noted that the leading envelope of the pack of envelopes in the magazine, which is indicated in dotted lines at 76, is resting upside down adjacent the forward edge of the plate 69 with the sealing flap downward and partially open.

The envelopes are withdrawn one at a time from the magazine and arranged upon the conveyor 31. To this end, a member 77 is utilized, the said member being formed or provided with a pair of spaced fingers 78. The latter lie at opposite sides of the arm and spring member 71 and 74 respectively. Each of the fingers 78 is formed with a hooked end 79 which is designed to enter between the sealing flap and the body of the leading envelope in the magazine and engage the fold provided by the said flap and body, whereby upon continued downward movement of the fingers 78, the envelope is withdrawn from the magazine. In this operation the fingers 78 are first moved upwardly so that the hooked ends thereof lie above the opening between the sealing flap and the body of the envelope. The said fingers are then moved downwardly to effect the withdrawal of the envelope in the manner described. These movements of the fingers 78 are effected by an arm 81 and the member 77, therefor is pivotally connected thereto by a pair of ears 80 formed or provided on the member 77 intermediate its ends.

The arm 81 is mounted for angular movement upon a shaft 82 which is suitably supported between the vertical plates 65. A gear 83 is fixed to the shaft 82 and meshes with an operating gear 84, the latter being mounted upon a shaft 85 carried by the side vertical plate members 65.

The member 77 at its lower end is formed with an extension 86 to which is connected a spring 87, the opposite end of the latter being connected to a projection 88 formed on the arm 81. The spring 87 normally acts against the extension 86 of the member 77 to urge the free end thereof, that is to say the portion which includes the finger 78, toward the envelope magazine. Thus, as the arm 81 moves upwardly the hooked ends of the fingers 78 move past the arm 71 and the spring member 74 and against the side of the leading envelope so that as the arm 81 moves downwardly the hooked ends 79 follow the body of the envelope, thereby insuring their engagement with the fold provided by the body and flap of the envelope. As the fold is engaged and the arm 81 continues to move downwardly, the envelope is drawn through the opening provided by the lower end of the arm 71 and the forward edge of the bottom plate 69.

In its movement from the magazine 63 the envelope is guided by an arcuate wall 89 which is arranged between and connected to the said plates 65 to the conveyor 31. At its lower extremity, the wall 89 terminates in a vertical rib 90 which fits in the slot 39a in the inwardly projecting portion 29 of the frame member 27. The front face of the rib 90 therefore, fits in the slot provided for the spacing member 40, the latter being cut away at this point.

It will, therefore, be apparent that as the arm 81 moves downwardly the envelope is carried by it over the arcuate wall 89 and upon the conveyor 31, the flap during the final movement of the envelope entering beneath the guide rail 39 (Figure 3) carried by the inwardly extending portion 28 of the side frame member 26. The movements of the conveyor are so co-ordinated with the movements of the arm 81 that a pair of shoulders 38 on the cross bars 35 of the conveyor are positioned to receive an envelope at each downward movement of the arm 81. It is understood, of course, that at such times the conveyor is at rest by virtue of the Geneva gearing drive heretofore described.

As the arm 81 moves upwardly in its return movement the hooked ends 79 of the fingers 78 are withdrawn from beneath the sealing flap of the envelope and the latter is carried forward lengthwise during the next forward movement of the conveyor. The front face of the rib 90 provides a guide for the bottom edge of the envelope until it enters beneath the guide rail provided beyond the last side plate 65, and also serves to prevent the return of the envelope during the return movement of the fingers 78. It will be noted that the side plate 65 in the direction of travel of the conveyor is cut away as at 94 to provide an opening through which the envelopes pass. The arm 81 is operated through the medium of the cam shaft 58 and the latter, therefore, carries at one end a crank 91. The said crank is connected by a connecting rod 93 to an arm 92 fixed at its inner end to the shaft 85 which carries the gear 84. Hence, rotation of the cam shaft 58 causes oscillatory movements of the arm 92, and such movements are transmitted by the gears 83 and 84 to the arm 81.

As an envelope which has been placed upon the conveyor is moved through the opening 94, it approaches a horn 95 (Figures 2, 4 and 5) the body of which is suitably secured by a lateral extension 96 upon a guide rail 39, it being noted that the said guide rail at this point extends forwardly of the said extension and terminates in a turned up end 41a. The body of the horn extends over the conveyor 31 at such a distance from the latter as to permit passage beneath it of the envelopes and the shoulders 38 between which they are positioned. At the opposite side of the conveyor, the other guide rail 39 is cut away, leaving only the spacing member 40 over which an angularly upwardly extending portion 97 of the horn projects, said portion being provided with a trailing end 98. The angularly upwardly extending portion 97 is formed with an edge 99 which at its forward end 100 merges into the body of the horn. From this point the edge diverges from the path of the conveyor. The horn 95 is formed in front of the diverging edge 99 with a forwardly projecting portion 101 which lies in advance of the edge 99 and which is supported in such a position relative to the path of the envelope that the said portion enters between the sealing flap and the body of the envelope as the latter approaches the edge 99 of the horn. Thus, as the envelope continues to move forward after entry of the forwardly extending portion 101 between the sealing flap and the body of the envelope the sealing flap is engaged by the diverging edge 99 of the horn and opened out to the position shown in dotted lines in Figure 5 and as the envelope continues to move forward the flap in this position is then engaged by the trailing end 98 of the horn and is maintained in such position.

The purpose of opening the sealing flap of the envelope in the manner described is to enable the proper positioning of the opening thread above the juncture of the sealing flap and the body of the envelope. The opening threads are cut off in portions of the desired length from a single continuous thread and in accordance with the invention, it is preferred that this be done after the opening threads have been affixed to the envelopes. The mechanism by which the continuous thread is supported is arranged for co-operation with the horn 95 whereby as the flap is held open by the trailing end 98 of the horn, that portion of the continuous thread which is to provide the opening thread of the envelope is positioned adjacent the juncture of the sealing flap and the body of the envelope.

The thread applying mechanism, as best shown in Figures 1, 4 and 6, includes a finger 102, which is carried by a rock member 103, the latter being suitably supported from a bracket 104 carried by the side frame member 27. The connection between the rock member 103 and the bracket 104 is provided by a longitudinally extending pin 105. The finger 102 is conveniently secured to the rock member 103 for movement therewith by means of a screw 106, the end 107 of the finger (Figure 4) fitting over the end of the pin 105. The continuous thread 108 (Figure 6) from which the opening threads are to be cut off may be unreeled from a spool or the like (not shown). It passes through an eyelet 109 behind a tensioning device 110 which includes a plate 110a (Figure 4) and a compression spring 111. From the tensioning device the thread is suitably guided to an eye 112 formed in the end of the finger. It will be noted that the finger extends across the conveyor and the eye in the end of the finger is located adjacent the side of the trailing end 98 of the horn 95. With reference to Figure 4, it will also be noted that after passing through the eye 112 of the finger the thread extends lengthwise of the machine, that is to say substantially parallel to the trailing end 98 of the horn and in the direction of travel of the conveyor. The trailing end of the horn 98 as heretofore described, lies above the opened sealing flap of the envelope and the finger 102 is arranged to support the thread 108 also above the envelope but adjacent the juncture of the sealing flap and the body of the latter.

As will hereinafter be described, means is provided whereby the thread 108 is caused to move step-by-step simultaneously with the conveyor 31, and hence as an envelope moves from beneath the trailing end 98 of the horn that portion of the thread 108 which is to provide the opening thread of the envelopes overlies the latter adjacent the juncture of its sealing flap and body and the said portion moves along with the envelopes, step-by-step, during which movement its position relative to the envelope is maintained.

Means is provided whereby that portion of the thread 108 which is to provide an opening thread is, after leaving the eye 112 of the finger 102 and during its feeding movement, impregnated or coated with an adhesive in order that it may be firmly secured to the envelope. The mechanism by which the adhesive is applied is best shown in Figures 4, 6 and 7. It includes a roll 113 which is arranged directly above the path of the thread 108 and adjacent the trailing end 98 of the horn 95. The roll 113 is carried by a driving shaft 114 and the latter is journalled at its ends in a bearing block 115. The roll 113 is suitably keyed upon the inner end of the shaft 114 against a bearing block 115 and is removably held in this position by a spring loaded element 116 which is formed to overlie an annular rib 117 formed on the roll. This construction enables the convenient removal of the roll 113, by first lifting the element 116 a short distance against the action of its spring. The shaft 114, and hence the roller 113, is rotated during the operation of the machine in order that a layer of adhesive may be constantly maintained upon the peripheral surface of the roll 113. To this end, the shaft 114 carries a pulley 118 and the latter is connected by a belt 119 to the pulley 46. It is to be noted that pulley 46 is the pulley heretofore mentioned in connection with the description of the Geneva gearing. The intermittent rotary movements of the pulley 46, therefore, will cause the adhesive applying roll 113 to function in a similar manner.

The adhesive which is to be applied to the opening thread is preferably a liquid and a supply thereof may be contained in suitable receptacle 120. The latter, as illustrated, is suitably supported upon the inwardly extending portion 28 of the side frame member 26. Adhesive from the receptacle 120 is delivered by a roll 121 and a disk 122 to the adhesive applying roll 113. The disk 122 is loosely mounted upon a pin 123 and at its opposite sides engage the peripheries of the rolls 113 and 121. An element 124 (Figure 4) formed with legs 125 is preferably employed for removing adhesive from the sides of the roll 121, the said legs bearing against the sides of the roll to accomplish this.

Figure 10:
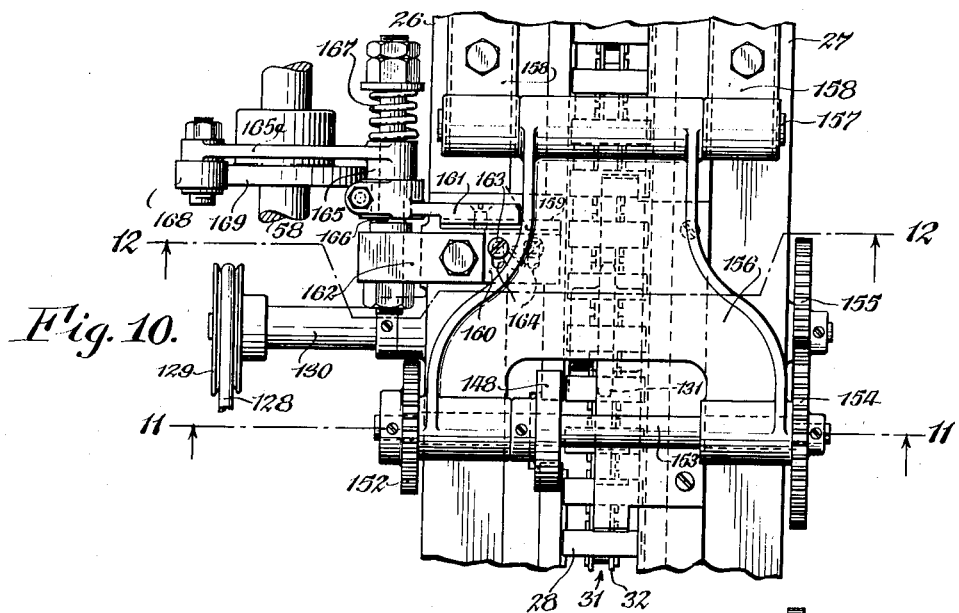
Figure 10 is an enlarged fragmentary view in plan which includes the mechanism for squeezing the thread between the sealing flap and the body of the envelope after the flap has been folded upon the thread and the mechanism by which the thread is severed after this operation to provide the protruding ends.
Figure 11:
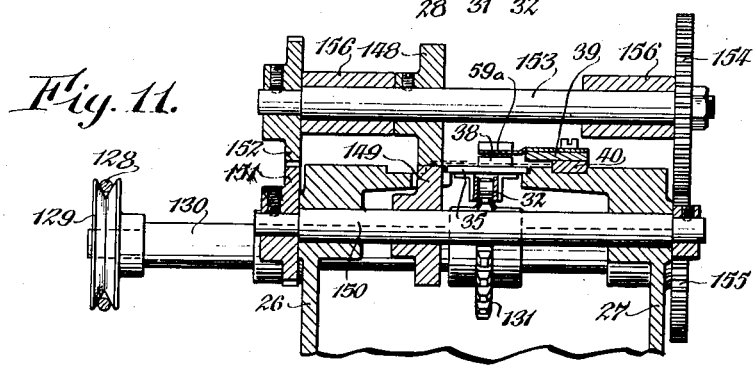
Figure 11 is a transverse section through the rolls of the squeezing mechanism and is taken along line 11—11 of Figure 10.

It is preferred that the roll 121 be positively driven in order to insure the uniform distribution of the adhesive upon the disk 122, and hence the roll 113. The roll 121, therefore, is carried by a shaft 126 which is journaled in a side wall of the receptacle 120, and secured upon the inner end of the shaft 126 in a manner similar to that in which the roll 113 is secured upon the shaft 114. A pulley 127, fixed to the outer end of the shaft 126, is connected by a belt 128 to a drive pulley 129 (Figures 1, 10 and 11). The latter is mounted upon a shaft 130 which extends transversely of the machine and which is journaled in the side frame members 26 and 27 thereof. The shaft 130 is arranged beneath the upper flight of the conveyor 31 and carries a sprocket 131, the teeth of which engage the links of the chain 32 of the conveyor. Any movement, therefore, of the conveyor is transmitted through the agency of the sprocket 131 to the pulley 129. It will be apparent, therefore, that as the conveyor 31 is caused to move step-by-step, its movements effect corresponding movements of the roll 121. Hence rolls 121 and 113 are both rotated step-by-step simultaneously with the step-by-step movements of the conveyor.

The finger 102 is adapted normally to support the continuous thread 108 gainst the adhesive applying roll 113 as shown in the dotted line position (Figure 6) and as the thread is drawn beneath and against the periphery of the said roll it is coated or impregnated with the adhesive carried thereby.

As previously noted, that portion of the continuous thread which is to provide the opening thread of an envelope is affixed to the envelope before it is severed from the continuous thread. As the envelopes are moved through the machine in single file, therefore, the opening threads of the envelopes between the horn 95 and the thread severing means to be hereinafter described are connected and comprise a single length of thread. Those portions of the thread which lie between adjacent envelopes are to provide the protruding ends of the opening threads. In accordance with the invention, means is provided for controlling the finger 102 whereby those portions of the thread 108 which are to provide the protruding ends of the opening threads escape the action of the adhesive applying roll 113. The said controlling means, as best shown Figures 4 and 6, is adapted, therefore, to lower away from the adhesive applying roll 113 those portions of the thread 108 which are to provide the protruding ends of the opening threads (see the full line position of the finger 102 in Figure 6). To this end, the block member 103 is formed with a downwardly extending arm 132 and the said arm is connected by a rod 133 to an arm 134. The latter is pivotally connected at its lower end to a shaft 135 which extends lengthwise of the machine beneath the cam shaft 58 and which is journalled at its ends in two of the brackets 58a. The arm 134 carries a roller 36 which bears against the periphery of the cam 137 carried by the cam shaft 58. The roller 136 is caused to follow the periphery of the cam 137 by a spring 138 which is suitably connected at one end to the side frame member 26 and at its upper end to the rock member 103. From the foregoing it will be apparent, therefore, that as the cam shaft 58 rotates and the roller 136 follows the periphery of the cam 137, the finger 102 will be operated to move the thread 108 against and away from the roll 113. Hence, the possibility of those portions of the thread which are to provide the protruding ends of the opening threads adhering to adjacent parts of the machine is avoided as well as the possibility of their adhering to one another or to adjacent envelopes after delivery from the machine.

As the envelope and that portion of the coated or impregnated thread 108 which is to constitute its opening thread move away from the trailing end of the horn 95, the sealing flap is open and the opening thread is traveling with the envelope and lies adjacent or along the juncture between the sealing flap and the body thereof. In accordance with the invention it is preferred that in order to obtain the effective securement of the opening thread to the envelope that the former be pressed against the latter. The mechanism for obtaining this end is best shown in Figures 1, 2, 8 and 9. It includes a slide 139 which is supported upon the lateral extension 140 of the side frame member 26. The said slide is formed with longitudinally extending slots 141 which co-operate with screws 142 or other suitable guide means for permitting a reciprocating movement of the slide 139 in the direction of its length. The forward end of the slide which is preferably rounded extends a short distance, when in its retracted position, over the slot 40a provided for the spacing member 40, the latter, as is also the companion guide rail 39, being cut away adjacent the rounded end of the slide in order to permit its movement in the direction of the conveyor 31. During rest periods of the conveyor the slide 139 moves forward to engage the sealing flap of the envelope which lies opposite it during which movement the slide folds the said flap over the thread 108. The slide 139 is designed to permit movement under it of the envelope during the next forward movement of the conveyor. The advancing and retracting movements of the slide 139 are produced by the cam shaft 58. The latter, therefore, is suitably connected by a connecting rod 143 to an arm 144. The said arm is mounted at its lower end upon the shaft 135 and carries a roller 145 which co-operates with a cam 146 mounted upon the cam shaft 58. Co-operation between the roller 145 and the periphery of the cam 146 is maintained by a spring 147.

After the sealing flap has been folded over the opening thread in the manner described, the latter is squeezed between the said flap and the body of the envelope in order to insure the effective securement of the said thread to the envelope.

This is accomplished by a pair of rolls 148 and 149 between which the envelope is passed after its flap has been folded upon the tearing thread as described. The two rolls are arranged so that the upper one engages the sealing flap over the thread 108 while the lower roll engages the side of the envelope against which the thread is resting. It will be noted that the slide 139 is arranged for movement close to the rolls 148 and 149 so that the flap of the envelope during the time that the latter is approaching the rolls is held down, thereby insuring entry of the fold of the envelope between the rolls in the desired manner.

The roll 149 is carried by a shaft 150, the ends of which are suitably journalled in the side frame members 26 and 27. It carries upon its outer end adjacent the side frame member 26 a gear 151 which meshes with a companion gear 152 carried by a shaft 153, the roll 148 being mounted upon the said shaft. A second gear 154 is mounted on the shaft 153 and the said gear meshes with a driving gear 155 carried by the shaft 130. Thus, as the shaft 130 is operated through the agency of the sprocket 131 and the conveyor chain 32 the rolls 148 and 149 are driven. The movement of these rolls, of course, is intermittent by virtue of the intermittent movement of the conveyor 31. Maintenance of the co-operating relation between the chain 32 and the sprocket 131 is obtained by a member 59a which is secured above the conveyor to a guide rail 39 in close proximity to the shoulders 38 of the conveyor bars 35, thereby preventing movement of the chain 32 away from the said sprocket.

The rolls 148 and 149 are also availed of to draw the thread 108 through the eye of the finger 102 against the action of the thread tensioning means 110. The rolls, therefore, serve to hold freely for movement lengthwise of the machine a length of the said thread sufficient to provide opening means for a plurality of envelopes. The said length of thread and the envelopes to which the thread is to be affixed move along step-by-step toward the delivery end of the machine. The rolls 148 and 149 serve, therefore, to squeeze the thread 108 between the sealing flap and the body of the envelope and also to produce the feeding movements of the said thread. In the latter capacity, it will be noted that during the passage between the said rolls of the fold provided by the body and the sealing flap of an envelope, the feeding movement of the rolls is transmitted by the sealing flap and the body of the envelope to the thread which is positioned between them. After movement of the envelopes beyond the rolls 148 and 149, the feeding movement of the thread 108 is produced by the direct action of the said rolls upon that portion of the thread which lies between the said envelope and the next succeeding envelope. In order to enable the operation of the rolls 148 and 149 in the desired manner, whether the feeding movement be by virtue of the direct or indirect action of the rolls, means is provided to enable relative movement between them. The shaft 153, therefore, is carried by a member 156 which is pivoted at its inner end upon a shaft 157, the said shaft being suitably supported from the side frame members 26 and 27 of the machine by bearing brackets 158. The relative bodily movement between the rolls 148 and 149 is comparatively small, not being great enough to prevent co-operation of the gears 154 and 155 and 151 and 152 in the manner required.

As heretofore described, the envelopes upon the conveyor 31 are carried forward by the latter toward the rolls 148 and 149, while those portions of the thread 108 which are to be affixed thereto are moved along in the desired relation to the envelopes by the said rolls.

As the envelopes emerge from between the rolls 148 and 149, they continue to move forward upon the conveyor and inasmuch as a portion of the thread 108 is, at this point, affixed to an envelope, the thread beyond the said rolls is carried forward by the envelopes themselves. The envelopes, therefore, together with those portions of the thread 108 by which they are connected, are carried to a mechanism where the thread is severed beyond the ends of the envelopes at such a distance as to leave protruding portions of the desired length. The mechanism by which this end is obtained is best shown in Figures 1, 2, 10 and 12. It includes a movable blade 159 and a fixed blade 160. The former is carried by a holder 161 and the latter carried on the inner end of a block 162. The said block is suitably secured to the inwardly extending portion 28 of the side frame member 26 and the blade 160 is preferably secured thereto by screws 163 which are carried by the said block and which extend through slots 164 formed in the blade, thereby enabling adjustment of the blade 160 relative to the blade 159. It will be noted that opposite the movable and fixed blades 159 and 160 respectively the top guide rail 39 and the spacing member therefor have been cut away so as to permit operation of the blades close to the conveyor 31.

Figure 12:
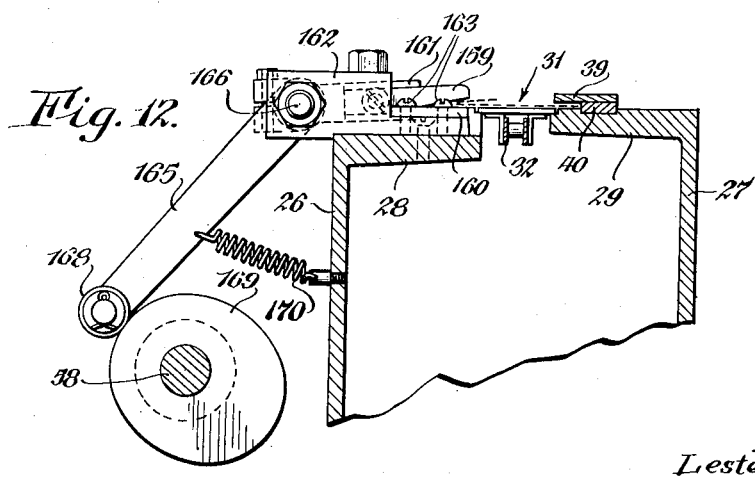
Figure 12 is a similar section of the thread severing mechanism taken along line 12—12 of Figure 10.
Figure 19:
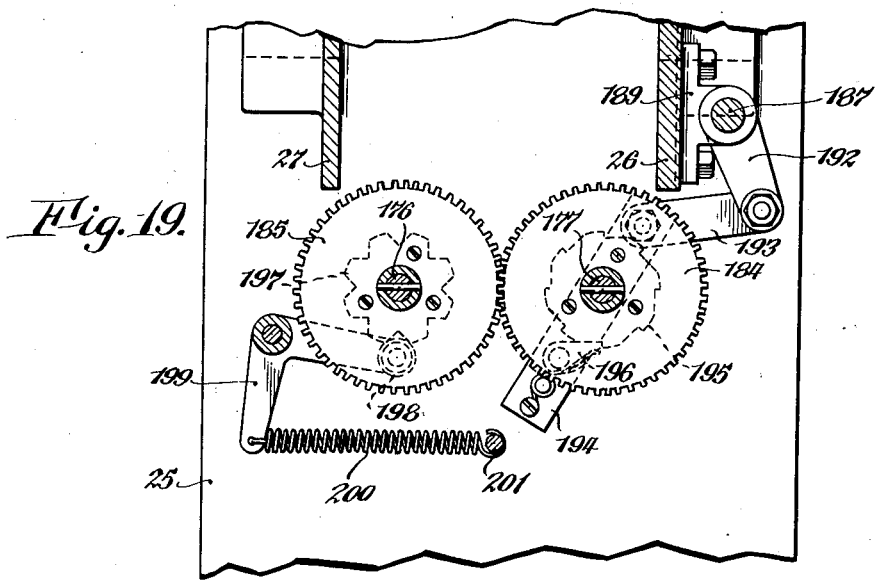
Figure 19 is a horizontal fragmentary section of the delivery end of the machine and is taken along line 19—19 of Figure 17.
Figure 20:
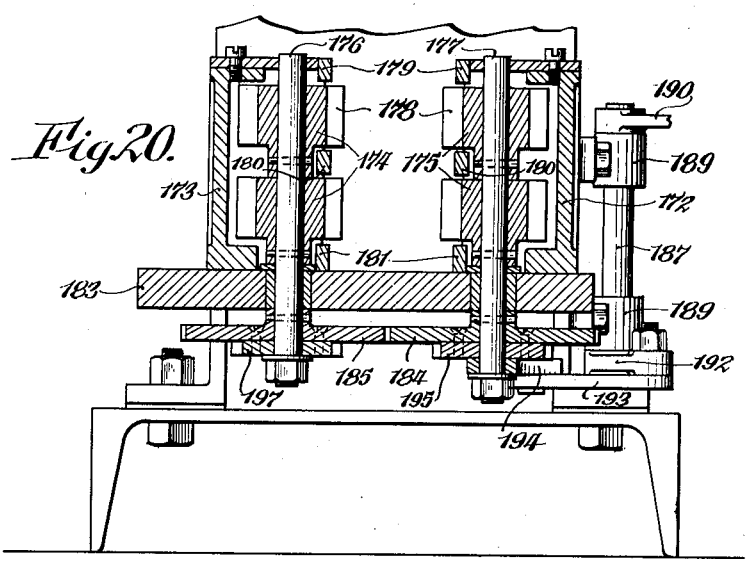
Figure 20 is a vertical section taken along line 20—20 of Figure 18.

As illustrated in Figure 12, the blades of the shearing mechanism are normally separated to the extent indicated in full lines and when in this position the sealing flap edges of the envelopes and the sections of thread by which they are connected pass over the fixed blade 160 beneath the overhanging movable blade 159. The operating mechanism for the blade 159 is so co-ordinated with the operating mechanism of the conveyor 31 that as the latter comes to rest the blade 159 which overlies the thread 108 substantially midway between a pair of adjacent envelopes moves downwardly and severs the thread at this point. During the next forward movement of the conveyor, the remaining envelope of the pair mentioned by way of illustration is moved beyond the blades 159 and 160, thereby positioning that portion of the thread connecting the said envelope and the next succeeding envelope beneath the said blades and in the next operation of the latter the thread is again severed in the manner described. The envelopes are so arranged upon the conveyor that the portion of thread which connects a pair of adjacent envelopes is long enough, when severed substantially midway between the envelopes, to provide a protruding end for each of the envelopes. In order to operate the movable blade 159 in the manner required, the holder 161 thereof is carried upon a hub 165 formed on the end of an arm 165a and the latter is pivotally mounted upon a shaft 166. The said shaft is journalled in the outer end of the block 162 and carries a compression spring 167 at the opposite side of the arm 165. The latter functions to maintain the desired relation between the movable and the fixed blades. The arm 165 carries a roller 168 which co-operates with a cam 169 to produce the required movements of the blade 159. The cam 169 is mounted upon the cam shaft 58 and the roller 168 is caused to follow the periphery thereof by a suitable spring 170.

After the thread 108 has been severed at both ends of the envelope, the latter is moved forward by the conveyor 31 beneath the guide rails 39 toward the delivery end of the machine. At this end of the machine, the side frame members 26 and 27 are connected by a member 171 (Figure 2), and the guide rails 39 terminate beneath the said member. The sector-like blocks 45, to which reference has heretofore been made and one of which carries the driven member 43 of the Geneva gearing, are formed or provided with arcuate guide members 39b. The latter provide a continuation of the guide rails 39 and follow the conveyor 31 about the sprocket 34. The guide member 39b extends approximately to a point which is in a horizontal line with the center of the shaft 44 and terminates above an ejecting mechanism E, best shown in Figures 1, 17, 18, 19 and 20. The various parts of the said mechanism are carried by reduced extensions 172 and 173 of the side frame members 26 and 27 respectively and include two pairs of ejector wheels 174 and 175. The pairs of ejector wheels are carried on vertical shafts 176 and 177 and the wheels of each pair are formed with aligned ribs 178. The ribs of the ejector wheels of each pair are adapted for co-operation with the ribs of the other pair of ejector wheels to receive the envelopes as they are delivered from the conveyor. The ejector wheels are rotated simultaneously step-by-step, receiving the envelopes one at a time during their rest periods, as best shown in Figure 18, and during their step-by-step movements delivering the envelopes thus received to a receiving rack R. The said receiving rack is provided by upper, intermediate and lower guide rails 179, 180 and 181, respectively and a bar 182. The ejector wheels are supported upon a plate 183 which is suitably secured to the bottoms of the reduced extensions 172 and 173 of the side frame members 26 and 27, respectively. The bar 182 is suitably secured in an opening formed in the plate 183 so that its upper surface is flush with the latter. The intermediate side rails are suitably secured between the ejector wheels of each pair to housing partitions 178a. It will be apparent that as the envelopes with opening threads affixed thereto are delivered from the conveyor 31 they are moved out upon the receiving rack R where they accumulate for removal.

In order to rotate the ejector wheels in the manner described the shaft 176 is provided below the bottom plate 183 with a gear 185 while the shaft 177 is provided with a gear 184, the latter gear meshing with the former. The intermittent movement of the shafts 176 and 177, and hence the ejector wheels, is accomplished by the cam shaft 58 which, for this purpose, carries at its outer end a cam 186. Upon the side of the reduced extension 172 of the side frame member 26 and adjacent the cam 186, a shaft 187 is suitably supported, as by upper and lower bearings 189. An arm 190 is fixed to the upper end of a shaft 187 and carries at its free end a roller 191 which co-operates with the cam 186. A second arm 192 is secured to the lower end of the shaft 187 and at its outer end it is connected to a link 193. The latter is connected to an element 194 pivotally mounted to the shaft 177 below a ratchet wheel 195, which is also fixed to the shaft 177. A dog 196 which is carried at the upper side of the element 194 is resiliently held in engagement with the ratchet wheel 195. It will be apparent that as the arm 192 is oscillated through the medium of the cam shaft 58, a step-by-step movement will be imparted to the gear 184, and hence the shaft 177, and by virtue of the co-operation between the gears 184 and 185 a like movement will be imparted to the shaft 176.

In order to prevent retractory movements of the ejector wheels the shaft 176 carries a detent wheel 197, the notches of which co-operate with a roller 198. The latter is carried on one arm of a bell crank 199 which is pivotally secured to the plate 183 and the other arm thereof is connected by a spring 200 to a pin 201 secured to the bottom bar 182 of the rack R. The various parts of the mechanism are so arranged that as the ribs of the ejector wheels approach a position where they are to receive an envelope the roller 198 enters one of the notches of the detent wheel 197. Thus, the ejector wheels are held stationary while receiving an envelope and during the return movement of the dog 196 to engage the next shoulder on the ratchet wheel 195. As the dog 196 engages the next succeeding shoulder on the ratchet wheel 195 and again moves forward the ejector wheels carry the envelope forward and deliver it to the receiving rack, during which movement the roller 198 rides out of the notch in the detent wheel 197 and approaches the next succeeding notch which it enters as ribs of the ejector wheels approach the next envelope receiving position.

In the operation of the machine, the envelopes to which opening threads are to be affixed are placed in the magazine 63 against the spring member 74 with their sealed flaps downward and facing the conveyor. With power being applied to the main drive pulley 51 the Geneva gearing causes the conveyor 31 to move step-by-step past the envelope magazine toward the delivery end of the machine. During each rest period of the conveyor 31, the arm 81 is operated to withdraw an envelope from the magazine and deliver it to the conveyor. In this operation, the envelope is positioned in the guideway with its sealing flap edge upward and beneath the guide rail 39, its opposite or bottom edge lying adjacent the guide face provided by the vertical rib 90. The conveyor 31 then moves forward a step thereby moving the envelope into engagement with the horn 95 by which its flap is opened. At the same time, the conveyor is conditioned to receive another envelope from the magazine 63 during the next downward movement of the arm 81. It will, therefore, be apparent that during the operation of the machine a series of envelopes will be moved through the machine in a single file upon the conveyor 31. During their passage through the machine each envelope after having its flap opened moves beneath that portion of the thread 108 which is subsequently to be affixed to it with the said portion being positioned adjacent the juncture between the sealing flap and the body of the envelope.

As the envelope moves beneath that portion of the thread which is to become affixed to it, an adhesive is applied to the thread. At this point the flap lies away from the thread and as the envelope and thread move toward the delivery end of the machine the flap is folded over upon that portion of the thread which lies beneath it. With the flap held in this position, the fold produced by the closing of the flap and which includes the thread, is passed between the rolls 148 and 149. The latter squeeze the thread between the sealing flap and the body of the envelope, thereby effecting the securement of the thread to the envelope. At the same time the rolls 148 and 149 feed the thread 108 adjacent the juncture of the sealing flap and the body of the following envelope whereby its opening thread may be affixed in the manner described. Upon emerging from the rolls 148 and 149, those portions of the thread 108 which connect the adjacent envelopes are severed between the latter to provide the protruding ends. The envelopes to which the opening threads have been affixed are then delivered from the machine by the ejector wheels 174 and 175 to the receiving mechanism where they collect in the receiving rack.

In starting the machine, it will be apparent that inasmuch as the feeding movement of the thread 108 is produced by the rolls 148 and 149 the thread, should before the delivery of the envelopes to the conveyor 31, be inserted between the said rolls. By doing this, the feeding movements of the thread 108 will be started so that as the first envelope passes beneath the horn 95 and adhesive applying roll 113, that portion of the thread which is to provide the opening thread for the envelope will be conditioned and arranged for the operations to follow.

From the foregoing, it will be apparent that the machine is capable of affixing effectively and accurately tearing threads to completely formed envelopes. The thread which is affixed to each envelope has the adhesive applied to it only throughout its intermediate extent, that is to say, that portion which when affixed to the envelope lies between the ends thereof. The ends of the thread which may be pulled in the opening operation protrude to the desired extent at opposite ends of the envelope and are free from the adhesive. Thus, those portions of the thread to which the adhesive has been applied are completely covered by the sealing flaps of the envelopes prior to the delivery of the latter from the machine and hence the possibility of the said portions adhering to adjacent parts of the machine, or to adjacent envelopes after delivery from the machine, is avoided.

It will be noted that the thread which has been affixed to an envelope is secured adjacent the juncture of the flap and the body of the envelope and adheres to the envelope substantially throughout its length. The thread, therefore, being pressed against the envelope, does not interfere to an objectionable extent with the insertion of the contents of the envelope. The adherence of the thread in this manner is also desirable because of the increased effectiveness of the latter while the envelope is being opened. Either of the protruding ends of the thread may be grasped and pulled in a substantially transverse direction to the fold of the envelope thereby tearing the envelope open along the fold without possibility of the thread becoming unfixed from the envelope and slipping out lengthwise instead of functioning in the manner required.

We claim as our invention:

1. In a machine for affixing opening threads to envelopes, the combination of means to which the envelopes are delivered and by which they are moved through the machine, means for opening the flap of an envelope, means for positioning a thread to which an adhesive has been applied adjacent the juncture of the flap and the body of the envelope and means for folding the flap upon the said thread.

2. In a machine for affixing opening threads to envelopes, the combination of means to which the envelopes are delivered and by which they are moved through the machine, means for opening the flap of an envelope, means for positioning a thread to which an adhesive has been applied adjacent the juncture of the flap and the body of the envelope, means for folding the flap upon the thread and means for squeezing the thread between the flap and the body of the envelope whereby the securement of the thread to the envelope is effected.

3. In a machine for affixing opening threads to envelopes, the combination of means to which the envelopes are delivered and by which they are moved through the machine, means for opening the flap of an envelope, means for feeding a thread adjacent the juncture of the flap and the body of the envelope, means for applying an adhesive to the thread during its feeding movement and means for folding the flap upon the said thread whereby the securement of the thread to the envelope may be effected.

4. In a machine for affixing opening threads to envelopes, the combination of means to which the envelopes are delivered and by which they are moved through the machine, means for opening the flap of an envelope, means for feeding a thread adjacent the juncture of the flap and the body of the envelope, means for applying an adhesive to the thread during its feeding movement, means for then folding the flap upon the thread and means for squeezing the thread between the flap and the body of the envelope whereby the securement of the thread to the envelope is effected.

5. In a machine for affixing opening threads to envelopes, the combination of a conveyor by which the envelopes are moved through the machine, a magazine in which the envelopes are initially placed, means for withdrawing the envelopes from the magazine and delivering them to said conveyor, means for opening the flap of an envelope, means for positioning a thread to which an adhesive has been applied adjacent the juncture of the flap and the body of the envelope and means for folding the flap upon the said thread, whereby the securement of the thread to the envelope may be effected.

6. In a machine for affixing opening threads to envelopes, the combination of a conveyor by which the envelopes are moved through the machine, a magazine in which the envelopes are initially placed, means for withdrawing the envelopes from the magazine and delivering them to said conveyor, means for opening the flap of an envelope, means for positioning a thread to which an adhesive has been applied adjacent the juncture of the flap and the body of the envelope, means for then folding the said flap upon the thread and means for squeezing the thread between the flap and the body of the envelope, whereby the securement of the thread to the envelope is effected.

7. In a machine for affixing opening threads to envelopes, the combination of a conveyor by which the envelopes are moved through the machine, a magazine in which the envelopes are initially placed, means for withdrawing the envelopes from the magazine and delivering them to said conveyor, means for opening the flap of an envelope, means for feeding a thread adjacent the juncture of the flap and the body of the envelope, means for applying an adhesive to the thread during its feeding movement and means for folding the flap upon said thread, whereby its securement to the envelope may be effected.

8. In a machine for affixing opening threads to envelopes, the combination of a conveyor by which the envelopes are moved through the machine, a magazine in which the envelopes are initially placed, means for withdrawing the envelopes from the magazine and delivering them to said conveyor, means for opening the flap of an envelope, means for feeding a thread adjacent the juncture of the flap and the body of the envelope, means for applying an adhesive to the thread during its feeding movement and means for folding the flap upon said thread, whereby its securement to the envelope may be effected.

9. In a machine for affixing opening threads to envelopes, the combination of a conveyor by which the envelopes are moved through the machine, a magazine in which the envelopes are initially placed, means for withdrawing the envelopes from the magazine and delivering them to said conveyor, means for opening the flap of an envelope, means for feeding a thread adjacent the juncture of the flap and the body of the envelope, means for applying an adhesive to the thread during its feeding movement, means for folding the flap upon the thread and means for squeezing the thread between the flap and the body of the envelope whereby the securement of the thread to the envelope is effected.

10. In a machine for affixing opening threads to envelopes, the combination of a conveyor to which the envelopes are delivered and by which they are moved through the machine, means for opening the flap of an envelope, means for applying an adhesive to spaced parts of a continuous thread thereby to provide sections having a portion thereof to which an adhesive has been applied and adjacent portions which do not include the adhesive, means for positioning the portion of each section to which the adhesive has been applied adjacent the juncture of the flap and the body of the envelope, and means for pressing that portion of the thread to which the adhesive has been applied against the envelope, whereby its securement to the latter is effected.

11. In a machine for affixing opening threads to envelopes, the combination of a conveyor to which the envelopes are delivered and by which they are moved through the machine, means for opening the flap of an envelope, means for positioning a thread having a portion thereof to which an adhesive has been applied and adjacent portions which do not include the adhesive adjacent the juncture of the flap and the body of the envelope, and means for folding the flap upon that portion of the thread to which the adhesive has been applied, whereby the securement of the thread to the envelope may be effected.

12. In a machine for affixing opening threads to envelopes, the combination of a conveyor to which the envelopes are delivered and by which they are moved through the machine, means for opening the flap of an envelope, means for positioning a thread having a portion thereof to which an adhesive has been applied and adjacent portions which do not include the adhesive adjacent the juncture of the flap and the body of the envelope, means for folding the flap upon that portion of the thread to which the adhesive has been applied and means for squeezing the thread between the flap and the body of the envelope, whereby the securement of the thread to the envelope is effected.

13. In a machine for affixing opening threads to envelopes, the combination of a conveyor to which the envelopes are delivered and by which they are moved through the machine, means for opening the flap of an envelope, means for feeding a thread adjacent the juncture of the flap and the body of the envelope, means for applying an adhesive to a portion of the thread during its feeding movement, those portions of the thread adjacent the portion to which the adhesive has been applied and which are to provide protruding ends escaping the action of the adhesive applying means and means for folding the flap upon that portion of the thread to which the adhesive is applied, whereby its securement to the envelope may be effected.

14. In a machine for affixing opening threads to envelopes, the combination of a conveyor to which the envelopes are delivered and by which they are moved through the machine, means for opening the flap of an envelope, means for feeding a thread adjacent the juncture of the flap and the body of the envelope, means for applying an adhesion to a portion of the thread during the feeding movement of the thread, those portions of the thread adjacent the portions to which the adhesive has been applied and which are to provide protruding ends escaping the action of the adhesive applying means, means for folding the flap upon that portion of the thread to which the adhesive has been applied and means for squeezing the thread between the flap and body of the envelope, whereby securement of the thread to the envelope is effected.

15. In a machine for affixing opening threads to envelopes, the combination of a conveyor by which the envelopes are moved through the machine, a magazine in which the envelopes are initially placed, means for withdrawing the envelopes from the magazine and delivering them to said conveyor, means for opening the flap of the envelope, means for feeding a thread adjacent the juncture of the flap and the body of the envelope, means for applying an adhesive to a portion of the thread during its feeding movement, those portions of the thread adjacent the portion to which the adhesive is applied and which are to provide protruding ends escaping the action of the adhesive applying means and means for folding the flap upon that portion of the thread to which the adhesive has been applied, whereby its securement to the envelope may be effected.

16. In a machine for affixing opening threads to envelopes, the combination of a conveyor by which the envelopes are moved through the machine, a magazine in which the envelopes are initially placed, means for withdrawing the envelopes from the magazine and delivering them to said conveyor, means for opening the flap of an envelope, means for feeding a thread adjacent the juncture of the flap and the body of the envelope, means for applying an adhesive to a portion of the thread during the feeding movement of the thread, those portions of the thread adjacent the portion to which the adhesive has been applied and which are to provide protruding ends escaping the action of the adhesive applying means, means for folding the flap upon that portion of the thread to which the adhesive is applied and means for squeezing the thread between the flap and body of the envelopes, whereby the securement of the thread to the envelope is effected.

17. In a machine for affixing opening threads to envelopes, the combination of means to which the envelopes are delivered and by which they are moved step-by-step through the machine, means for opening the flap of an envelope, means for positioning a thread to which an adhesive has been applied adjacent the juncture of the flap and the body of the envelope and means for folding the flap upon said thread, whereby the securement of the thread to the envelope may be effected.

18. In a machine for affixing opening threads to envelopes, the combination of means to which the envelopes are delivered and by which they are moved step-by-step through the machine, means for opening the flap of an envelope, means for positioning a thread to which an adhesive has been applied adjacent the juncture of the flap and the body of the envelope, means for then folding the flap upon the thread and means for squeezing the thread between the flap and the body of the envelope, whereby the securement of the thread to the envelope is effected.

19. In a machine for affixing opening threads to envelopes, the combination of means to which the envelopes are delivered and by which they are moved step-by-step through the machine, means for opening the flap of an envelope, means for feeding a thread adjacent the juncture of the flap and the body of the envelope, means for applying an adhesive to the thread during its feeding movement, means for folding the flap upon said thread and means for squeezing the thread between the flap and the body of the envelope, whereby its securement to the envelopes is effected.

20. In a machine for affixing opening threads to envelopes, the combination of means by which the envelopes are moved through the machine step-by-step, a magazine in which the envelopes are initially placed, means for withdrawing the envelopes from said magazine and delivering them to said means first mentioned, means for opening the flap of an envelope, means for positioning a thread to which an adhesive has been applied adjacent the juncture of the flap and the body of the envelope, means for folding the flap upon said thread and means for squeezing the thread between the flap and body of the envelope, whereby its securement to the envelope is effected.

21. In a machine for affixing opening threads to envelopes, the combination of means by which the envelopes are moved through the machine step-by-step, a magazine in which the envelopes are initially placed, means for withdrawing the envelopes from said magazine and delivering them to said means first mentioned, means for opening the flap of an envelope, means for feeding a thread adjacent the juncture of the flap and the body of the envelope, means for applying an adhesive to the thread during its feeding movement, means for folding the flap upon the thread and means for squeezing the thread between the flap and body of the envelope, whereby its securement to the envelope is effected.

22. In a machine for affixing opening threads to envelopes, the combination of means for moving the envelopes through the machine step-by-step, a magazine in which the envelopes are initially placed, means for withdrawing the envelopes from said magazine and delivering them to said means first mentioned, means for opening the flap of an envelope, means for feeding a thread adjacent the juncture of the flap and the body of the envelope, means for applying an adhesive to the thread, means for preventing the application of the adhesive to those portions of the thread which are to provide the protruding ends of the opening thread and means for pressing against the envelope that portion of the thread to which the adhesive has been applied, whereby its securement to the envelope is effected.

23. In a machine for affixing opening threads to envelopes, the combination of means for moving the envelopes through the machine step-by-step, a magazine in which the envelopes are initially placed, means for withdrawing the envelopes from said magazine and delivering them to said means first mentioned, means for opening the flap of an envelope, means for feeding a thread adjacent the juncture of the flap and the body of the envelope, means for applying an adhesive to the thread, means for preventing the application of the adhesive to those portions of the thread which are to provide the protruding ends of the opening ends of the opening thread, means for folding the flap upon that portion of the thread to which the adhesive has been applied and means for squeezing the thread between the flap and the body of the envelope, whereby its securement to the envelope is effected.

24. In a machine for affixing opening threads to envelopes, the combination of a conveyor for moving the envelopes through the machine, a magazine in which the envelopes are initially placed, means for withdrawing the envelopes one at a time from the magazine and delivering them to the conveyor where they are positioned in single file, means for feeding a thread adjacent the juncture of the flap and the body of the envelope as the latter is moved along by the conveyor, means for applying an adhesive to the thread during its feeding movement, said thread feeding means being utilized for pressing the thread against the envelope in order that its securement to the latter is effected and means for severing said thread at a point beyond the end of the envelope to provide a protruding end.

25. In a machine for affixing opening threads to envelopes, the combination of a conveyor for moving the envelopes through the machine, a magazine in which the envelopes are initially placed, means for withdrawing the envelopes one at a time from the magazine and positioning them on the conveyor in single file, means for opening the flap of an envelope, means for feeding a thread adjacent the juncture of the flap and the body of the envelope as the latter is moved along by the conveyor, means for applying an adhesive to a portion of the thread, said thread feeding means being utilized for pressing the thread against the envelope to effect its securement thereto and means for severing the said thread beyond the end of the envelope to provide a protruding end.

26. In a machine for affixing opening threads to envelopes, the combination of a conveyor for moving the envelopes through the machine, a magazine in which the envelopes are initially placed, means for withdrawing the envelopes one at a time from the magazine and positioning them upon the conveyor in single file, means for opening the flap of an envelope, means for feeding a thread adjacent the juncture of the flap and the body of the envelope as the latter is moved along by the conveyor, means for applying an adhesive to a portion of the thread, means for folding the flap upon that portion of the thread to which the adhesive has been applied, said thread feeding means being utilized to squeeze the thread between the flap and the body of the envelope and means for severing the thread beyond an end of the envelope to provide a protruding end.

27. In a machine for affixing opening threads to envelopes, the combination of a conveyor for moving the envelopes through the machine, a magazine in which the envelopes are initially placed, means for withdrawing the envelopes one at a time, from the magazine and positioning them on the conveyor in single file, means for opening the flap of an envelope, means for feeding a thread adjacent the juncture of the flap and the body of the envelope as the latter is moved along by the conveyor, means for applying an adhesive to a portion of the thread, means for folding the flap upon that portion of the thread to which the adhesive has been applied, said thread feeding means being utilized to engage the flap and body of the envelope and squeeze them against said thread and means for severing the thread beyond an end of the envelope to provide a protruding end.

28. In a machine for affixing opening threads to envelopes, the combination of a conveyor for moving the envelopes through the machine, a magazine in which the envelopes are initially placed, means for withdrawing the envelopes, one at a time from the magazine and positioning them upon the conveyor in single file, means for opening the flap of an envelope, a pair of feed rollers, at least one of which is driven, for feeding a thread adjacent the juncture of the flap and the body of the envelope as the latter is moved along by the conveyor, means for applying an adhesive to a portion of the thread, means for folding the flap upon that portion of the thread to which the adhesive has been applied, said feed rolls being utilized to engage the flap and the body of the envelope and squeeze the thread between them and means for severing the thread beyond an end of the envelope to provide a protruding end.

29. In a machine for affixing opening threads to envelopes, the combination of a conveyor for moving the envelopes through the machine, a magazine in which the envelopes are initially placed, means for withdrawing the envelopes one at a time from the magazine, and positioning them on the conveyor in single file, means for feeding a thread adjacent the juncture of the flap and the body of an envelope as the latter is moved along by the conveyor, means for applying an adhesive to the said thread, means for rendering said adhesive applying means inoperative as those portions of the thread which are to provide the protruding ends of the opening thread pass thereby, said thread feeding means being utilized to press against the envelope that portion of the thread to which the adhesive has been applied and means for severing said thread beyond an end of the envelope to provide a protruding end.

30. In a machine for affixing opening threads to envelopes, the combination of a conveyor for moving the envelopes through the machine, a magazine in which the envelopes are initially placed, means for withdrawing the envelopes one at a time from the magazine and positioning them on the conveyor in single file, means for opening the flap of an envelope, means for feeding a thread adjacent the juncture of the flap and the body of the envelopes, means for applying an adhesive to the said thread, means for rendering said adhesive applying means inoperative as those portions of the thread which are to provide the protruding ends of the opening thread pass thereby, means for folding the flap upon that portion of the thread to which the adhesive has been applied, said thread feeding means being utilized to squeeze the flap and body of the envelope upon the thread and means for severing the thread beyond an end of the envelope to provide one of the protruding ends of the opening thread.

31. In a machine for affixing opening threads to envelopes, the combination of a conveyor for moving the envelopes through the machine, a magazine in which the envelopes are initially placed, means for withdrawing the envelopes one at a time from the magazine and for positioning them on the conveyor in single file, means for opening the flap of an envelope, feed rolls, at least one of which is driven, for feeding a thread adjacent the juncture of the flap and the body of the envelope as the latter is moved along by the conveyor, an adhesive applying roller against which the thread normally bears, means for preventing contact with the said roller of those portions of the thread which are to provide the protruding ends of the opening thread, means for folding the flap upon that portion of the thread to which the adhesive has been applied, said feed rolls being utilized to squeeze the flap and body of the envelope against said thread and means for severing the thread beyond an end of the envelope to provide one of the protruding ends of the opening thread.

32. In a machine for affixing opening threads to envelopes, the combination of means for moving the envelopes through the machine step-by-step, a magazine in which the envelopes are initially placed, means for withdrawing the envelopes one at a time from said magazine and delivering them to said means first mentioned where they are positioned in single file, means for feeding a thread adjacent the juncture of the flap and the body of the envelope as the latter is moved along by said means first mentioned, means for applying an adhesive to said thread, said thread feeding means being utilized to press the thread against the envelope and thereby effect its securement thereto and means for severing the thread beyond an end of the envelope to provide a protruding end for the opening thread.

33. In a machine for affixing opening threads to envelopes, the combination of means for moving the envelopes through the machine step-by-step, a magazine in which the envelopes are initially placed, means for withdrawing the envelopes one at a time from said magazine and delivering them to said means first mentioned whereby they travel through the machine in single file, means for opening the flap of an envelope, means for feeding a thread adjacent the juncture of the flap and the body of the envelope as the latter is moved along by said means first mentioned, means for applying an adhesive to said thread, means for folding the flap upon said thread, said thread feeding means being utilized to squeeze the flap and the body of the envelope against the thread and means for severing the thread beyond an end of the envelope to provide a protruding end for the opening thread.

34. In a machine for affixing opening threads to envelopes, the combination of means for moving the envelopes through the machine in single file, a magazine in which the envelopes are initially placed, means for withdrawing the envelopes one at a time from said magazine and for delivering them to said means first mentioned, means for feeding a thread adjacent the juncture of the flap and the body of the envelope as the latter is moved along by said means first mentioned, means for applying an adhesive to said thread, said thread feeding means being utilized to press the thread against the envelope in order to effect its securement to the latter and means for severing the thread at a point beyond an end of the envelope to provide a protruding end for the opening thread.

35. In a machine for affixing opening threads to envelopes, the combination of means for moving the envelopes through the machine, a magazine in which the envelopes are initially placed, means for withdrawing the envelopes one at a time from said magazine and delivering them to said means first mentioned, means for feeding a thread adjacent the juncture of the flap and the body of the envelope as the latter is moved along by said means first mentioned, means for applying an adhesive to said thread, means for pressing the thread against the envelope to effect its securement thereto, means for severing the thread beyond an end of the envelope to provide a protruding end for the opening thread, a receiving rack and means for discharging the envelopes to which the opening threads have been affixed into the said receiving rack.

36. In a machine for affixing opening threads to envelopes, the combination of a conveyor by which the envelopes are moved through the machine, a magazine in which the envelopes are initially placed, means for withdrawing the envelopes one at a time from said magazine and delivering them to said conveyor where they are positioned in single file, means for feeding a thread adjacent the juncture of the flap and the body of the envelope as the latter is moved along by the conveyor, means for applying an adhesive to said thread, means for pressing the thread against the envelope for effecting its securement thereto, means for severing the thread beyond an end of the envelope to provide a protruding end for the opening thread, a receiving rack and means for moving the envelopes to which the opening threads have been affixed away from said conveyor into the said receiving rack.

37. In a machine for affixing opening threads to envelopes, the combination of a conveyor by which the envelopes are moved through the machine step-by-step, a magazine in which the envelopes are initially placed, means for withdrawing the envelopes one at a time from said magazine and delivering them to said conveyor on which they are positioned in single file, means for opening the flap of an envelope, means for feeding a thread adjacent the flap and the body of the envelope as the latter is moved along by the conveyor, means for applying an adhesive to said thread, means for folding the flap upon the thread, said thread feeding means being utilized to squeeze the flap and body of the envelope against the thread, means for severing the thread at a point beyond an end of the envelope to provide a protruding end for the opening thread, a receiving rack and means for moving the envelopes to which opening threads have been affixed from said conveyor into said rack.

38. In a machine for affixing opening threads to envelopes, the combination of means to which the envelopes are delivered and by which they are moved through the machine, means for feeding a thread adjacent the juncture of the flap and body of an envelope and in the direction of travel of the latter, means for applying an adhesive to the thread and means for pressing the thread against the envelope whereby its securement to the latter is effected.

39. In a machine for affixing opening threads to envelopes, the combination of means to which the envelopes are delivered and by which they are moved step-by-step through the machine, means for feeding a thread adjacent the juncture of the flap and the body of an envelope and in the direction of travel of the latter, means for applying an adhesive to the thread and means for pressing the thread against the envelope whereby its securement to the latter is effected.

40. In a machine for affixing opening threads to envelopes, the combination of means to which the envelopes are delivered and by which they are moved through the machine, means for opening the flap of an envelope, means for feeding a thread adjacent the juncture of the flap and the body of the envelope and in the direction of travel of the latter, means for applying an adhesive to the thread and means for folding the flap upon the thread, whereby the securement of the thread to the envelope may be effected.

41. In a machine for affixing opening threads to envelopes, the combination of means to which the envelopes are delivered and by which they are moved through the machine, means for opening the flap of an envelope, means for feeding a thread adjacent the juncture of the flap and the body of the envelope and in the direction of travel of the later, means for applying an adhesive to the thread, means for folding the flap upon the thread and means for squeezing the thread between the flap and the body of the envelope, whereby its securement to the envelope is effected.

42. In a machine for affixing opening threads to envelopes, the combination of means to which the envelopes are delivered and by which they are moved through the machine, means for opening the flap of an envelope, means for feeding a thread adjacent the juncture of the flap and the body of the envelope and in the direction of travel of the latter, means for applying an adhesive to the thread, means for folding the flap upon the thread and means for squeezing the thread between the flap and body of the envelope, whereby its securement to the envelope is effected, said thread feeding means being utilized in the squeezing operation.

LESTER A. CHERRY.
CLARENCE N. FULLER.
AUGUSTUS H. LANE.